G. F. PUTNAM.
TAPE REEL.
APPLICATION FILED DEC. 26, 1912.
1,106,969.
Patented Aug. 11, 1914.
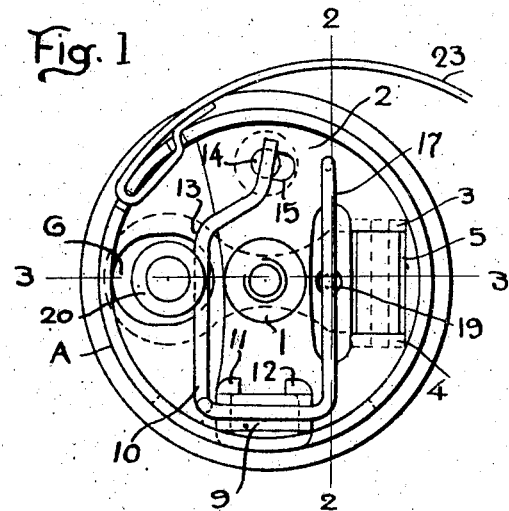
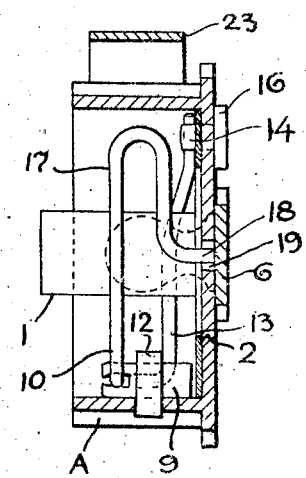
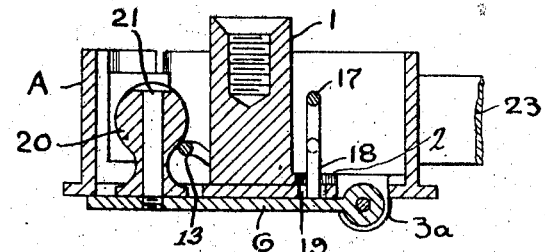
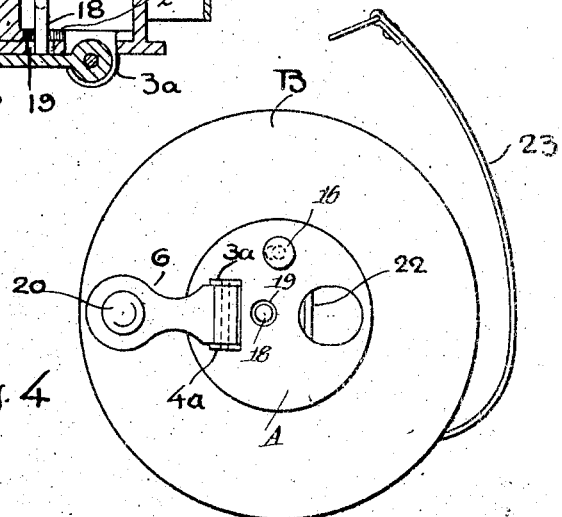
WITNESSES
INVENTOR
George F. Putnam
BY
Redgemond A. Parker
ATTORNEY

UNITED STATES PATENT OFFICE.

GEORGE F. PUTNAM, OF GOODRICH, MICHIGAN, ASSIGNOR, BY MESNE ASSIGNMENTS, TO THE LUFKIN RULE CO., OF SAGINAW, MICHIGAN, A CORPORATION OF MICHIGAN.

TAPE-REEL.

1,106,969.   Specification of Letters Patent.   Patented Aug. 11, 1914.

Application filed December 26, 1912. Serial No. 738,600.

*To all whom it may concern:*

Be it known that I, GEORGE F. PUTNAM, a citizen of the United States, residing at Goodrich, county of Genesee, State of Michigan, have invented a certain new and useful Improvement in Tape-Reels, and declare the following to be a full, clear, and exact description of the same, such as will enable others skilled in the art to which it pertains to make and use the same, reference being had to the accompanying drawings, which form a part of this specification.

This invention relates to measuring tape reels and has for its object a special form of construction for the mechanism that controls the handle or crank by which the reel is revolved. It embodies a unitary structure that performs both the function of latching the crank arm in position and thrusting the crank arm out from the side of the reel when the latch is released.

In the drawings:—Figure 1, is an elevation of the inside of the reel, one of the side walls being removed. Fig. 2, is a cross section on the line 2—2 of Fig. 1. Fig. 3, is a cross section on the line 3—3 of Fig. 1. Fig. 4, is a side elevation of the tape reel in place upon a tape casing, showing the crank in position for rotating the reel.

The tape reel or drum A is a closed-end cylinder having a central post 1 which is held in place by the plate 2. This plate is of the shape shown in Fig. 1 and it has a pair of ears 3 and 4 which are bent through the slot 5 in the end wall of the drum and form the brackets 3ª and 4ª that support the crank arm 6 by a pintle to allow pivotal movement. These ears 3 and 4 also serve to hold the plate 2 to the end wall of the drum. At the lower end of the showing in Fig. 1, a split plate 9 lies adjacent the side wall of the drum. Between the portions formed by the split is impinged a wire spring 10. The plate 9 is held in place by the portions 11 and 12 which are struck out of the metal of the side wall of the drum. This spring 10 has a latch arm 13 which extends across one side of the end of the drum and has a stud 14 fastened to its extreme end, the stud passing through a slot 15 so that the head of the stud 16 lies on the outside of the end wall of the drum; the other arm, which will be termed the thrust arm 17, extends across the opposite side of the end wall and returns part way upon itself and its end 18 engages through an opening 19 in the end wall and bears upon the crank arm 6 when that member is lying against the end wall of the drum as shown in Figs. 2 and 3. When the crank arm 6 lies against the end wall of the drum, it is held in that position by reason of the handle 20 which has a neck portion and an enlargement or head that are riveted to the handle by the rivet 21 and are engaged by the latch arm 13, which springs in against the neck portion and prevents the enlarged portion of the handle from passing by the spring without the exercise of force to thrust it by.

Referring to Fig. 1, it will be seen that, if the stud 14 is moved to the right in the slot 15, that it will move the latch arm 13 out from engagement with the handle and hence leave the handle free to move outward. Immediately the thrust arm 17 comes into play, the loop portion thereof being under tension, spreads and thrusts the crank arm 6 outward with some force so that it may be readily grasped and the crank arm may be caused to assume the position in Fig. 4, wherein it may be used to rotate the drum.

The measuring tape 23 is shown attached to the drum by a loop in Fig. 1. A conventional form of leather-covered casing B is shown in Fig. 4 and this shields the windings of the tape and also guides the tape to properly wind upon the reel. The other side wall of the tape drum A may be fastened to the post 1 by a screw (not shown) that engages in the screw-threads of the post. From the above description, it will be seen that my tape reel is simple and cheap to construct and effectively accomplishes the functions of latching the handle to the tape drum when not in use and forcing the handle out when the latch has been released.

What I claim is:—

1. A tape reel, having in combination, a cylinder upon which the tape winds and having an end wall provided with a hole, a crank arm for revolving the same pivoted thereto and provided with a handle, the said handle adapted to protrude through the said hole in the end wall of the cylinder when the crank arm lies against the end wall, a spring mounted in said cylinder and having an arm adapted to engage with the head of the handle to yieldingly hold the handle in the cylinder in closed position and a slidable stud on one end of the cylinder and attached to the spring wire for moving the spring wire out of engagement with the handle to release the crank arm, substantially as described.

2. A tape reel, having in combination, a cylinder upon which the tape winds and having an end wall provided with a hole, a crank arm for revolving the same pivoted to the cylinder and provided with a handle, the said handle adapted to protrude through the said hole in the end wall of the cylinder when the crank arm lies against the end wall, a unitary spring having one spring arm engaging with the handle to hold the handle in the cylinder and another arm pressing against a portion of the crank arm for thrusting the handle out when the spring arm that holds the handle in the cylinder is released, substantially as described.

3. A tape reel, having in combination, a cylinder upon which the tape winds and having an end wall provided with a hole, a crank arm pivoted thereto for revolving the cylinder and provided with a handle, the said handle adapted to protrude through the said hole in the end wall of the cylinder when the crank arm lies against the end wall, a spring held in said cylinder and provided with a latch arm that engages with the handle to hold the handle in the cylinder and a thrust arm that engages with a portion of the crank arm to thrust the crank arm out when the latch arm releases the handle, substantially as described.

In testimony whereof, I sign this specification in the presence of two witnesses.

GEORGE F. PUTNAM.

Witnesses:
   MILDRED CARMELL,
   DWIGHT T. STONE.